United States Patent [19]

Matyschik

[11] 3,921,775
[45] Nov. 25, 1975

[54] SELF CENTERING CLUTCH RELEASE BEARING

[75] Inventor: Otto Matyschik, Nudlingen, Germany

[73] Assignee: SKF Industrial Trading and Development Co., Amsterdam, Netherlands

[22] Filed: Nov. 29, 1973

[21] Appl. No.: 420,145

[30] Foreign Application Priority Data

Dec. 9, 1972 Germany............................ 7245198

[52] U.S. Cl. .................. 192/98; 308/233; 308/236
[51] Int. Cl.² .................... F16C 19/00; F16C 33/30
[58] Field of Search............ 192/98, 45, 110 B, 98; 308/233, 232, 236

[56] References Cited
UNITED STATES PATENTS 3,815,715  6/1974  Maucler............................... 308/233

Primary Examiner—M. Henson Wood, Jr.
Assistant Examiner—Richard A. Bertsch

[57] ABSTRACT

A self centering radial clutch release bearing and a supporting sleeve assembly. The release bearing comprises an inner race ring mounted about the sleeve, an outer race ring and a plurality of anti-friction bodies located therebetween. One of the race rings is mounted so as to be non-rotating with respect to the sleeve and to have a shank extending therefrom radially of the axis of the sleeve beyond the circle of rotation of the anti-friction bodies. The end of the shank lies opposite to a portion of the sleeve in a direction parallel to the axis of the sleeve. An elastic ring is mounted between the end of the shank and the sleeve.

10 Claims, 5 Drawing Figures

U.S. Patent  Nov. 25, 1975  3,921,775
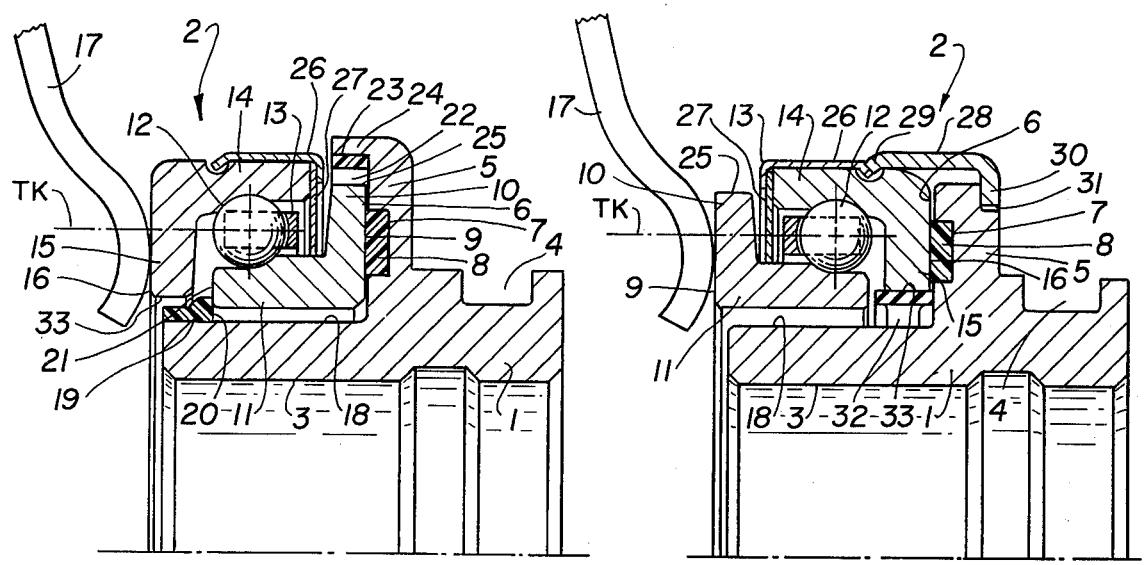
FIG.1
FIG.2
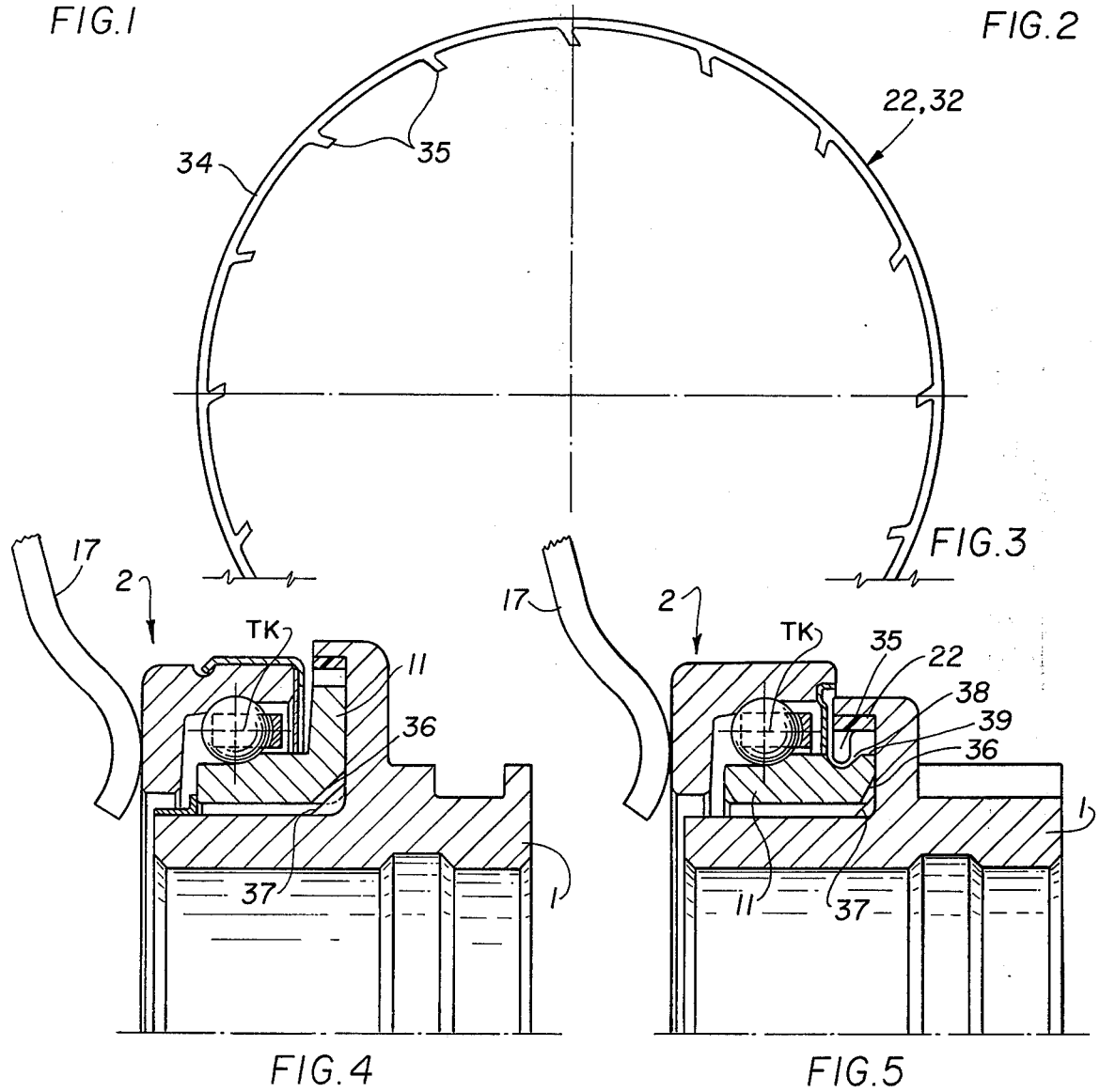
FIG.3
FIG.4
FIG.5

SELF CENTERING CLUTCH RELEASE BEARING

BACKGROUND OF THE INVENTION

The present invention relates to a self centering clutch release bearing assembly.

Clutch release bearing assemblies comprising a slidable sleeve on which is mounted a radial bearing, having at least one rotatable race ring, is well known. A clutch release lever connected to the clutch release mechanism, engages the rotatable race. To ensure proper operation, the bearing must be self-centering with respect to the clutch release lever. To this end, it is well known to mount the bearing on the sliding sleeve so as to be resiliently movable with respect to it by means of an annular spring member. In the known constructions it is possible only to form the bearing with such a particular configuration by which only one race ring can be rotated. It is therefore impossible to employ the known bearings in a manner wherein either one of the races may be selectively rotated.

It is the object of the present invention to overcome this disadvantage and to provide an assembly wherein either one of the race rings may be selectively employed as the rotating race member.

It is a further object of the invention to provide an improved simplified and more effective radial clutch release bearing assembly.

Additional objects, together with the numerous advantages of the present invention will be apparent from the following disclosure of its preferred embodiments.

SUMMARY OF THE INVENTION

In accordance with the present invention a self centering radial clutch release bearing and supporting sleeve assembly is provided. The inner race ring of the bearing is mounted about the sleeve and a plurality of anti-friction bodies are located thereabout between an outer race ring so as to rotate in a circle about the sleeve. One of the race rings is non-rotating. At least this non-rotating race ring is provided with an integral annular shank extending therefrom beyond the pitch circle of the rotating anti-friction bodies. The shank has an end lying opposite to the sleeve in a direction parallel to the axis of the sleeve. An elastic ring is mounted between the end of the shank and the sleeve providing the resilient means necessary to allow the bearing to be self-centering about the sleeve.

The present invention is to be distinguished from that described in the German GM No. 6,604,658, in which the races of the radial anti-friction bearing were each provided with shanks extending beyond the pitch circle of the bearing and in which an elastic coating was applied to the end of the shanks. In the present invention, the shanks are provided with an end surface which extends parallel to the axis of the bearing and which lies opposite to a portion of the supporting sleeve and which itself thus forms a bearing or supporting surface for the elastic resilient ring. The ring serves to radially adjust and center the bearing with respect to the clutch lever. This construction and result is not found in the aforementioned German utility model.

Preferably the elastic ring of the present invention is provided with an outer rim and a plurality of uniformly spaced, inwardly directed stubs or tongues which may be suitably deformed to one side under radial load conditions so as to equalize the stress in diametrically opposite directions.

It is further preferable to provide the stationary race, rather than the rotating race, with the elastic ring. A further advantage is obtained by supporting the frontal face of the shank of the non-rotating race with an auxiliary elastic ring held by a radially extending portion of the supporting sleeve.

Full details of the present invention are set forth in the following description and are illustrated in the accompanying drawings.

BRIEF DESCRIPTION OF THE DRAWINGS

In the drawings:

FIG. 1 shows a clutch release bearing according to the present invention having a rotating outer ring, FIG. 2 shows a clutch release bearing according to the invention with a rotating inner ring, FIG. 3 is an enlarged representation of the resilient load absorbing ring for centering the bearing, FIG. 4 illustrates the clutch release bearing of FIG. 1 as provided with anti-twist means, and FIG. 5 is a view of another clutch release bearing according to the present invention illustrating another form of anti-twist device.

DESCRIPTION OF THE INVENTION

Turning to FIG. 1, a clutch release bearing assembly is illustrated in partial sectional view. The bearing is annular about the central axis of rotation indicated as X—X. The assembly comprises a supporting sliding sleeve 1 on which is mounted a radial anti-friction bearing generally indicated by the numeral 2. The sliding sleeve 1 is provided with a cylindrical concentric bore 3 adapted to be slidingly mounted on a shaft or spindle, not shown. An annular groove 4 is formed on the outer surface of the sleeve and is adapted to receive for operative engagement the actuating components (not shown) of the clutch shift mechanism. The shift mechanism components are adapted to be moved so as to axially move the sleeve in a direction parallel to the central axis X—X. The sliding sleeve 1 is furthermore formed with an annular radially extending flange 5 forming an L-shaped support for the bearing 2. The inner face of the flange along its lower edge is provided with an annular groove 7 into which is force fit or pressed an elastic ring 8.

The bearing 2 comprises an inner race 11 extending axially about the sleeve 1. The race 11 has a shank 10 extending annularly, substantially radially outward or normal to the axis of the sleeve. The shank 10 is adapted to abut the plastic ring 8 set within the sleeve flange 5. In the embodiment shown in FIG. 1, the inner race 11 is adapted to be non-rotating. In addition to the inner race, the bearing 2 includes a plurality of anti-friction bodies 12, such as balls held in a cage 13 and an outer race 14 disposed generally parallel to the inner race ring. The outer race ring 14 is also provided with an annular shank 15 which extends substantially radially inward toward the sleeve. Preferably the shanks of each of the races 11 and 14 are integrally formed with the races so as to provide a one piece integral unit. The outer flanking surface 16 of the shank 15 is adapted to engage with the rotary clutch release lever 17, which is resiliently biased against it. As seen, the shanks 10 and 15 extend radially in their respective directions beyond the pitch circle, or circle of rotation of the balls 12, as defined by the line $T_k$.

An elastic ring 19 is pressed to the outer surface 18 of the sleeve 1 so that its frontal face 20 abuts against the opposing edge 21 of the inner race 11. Thus the inner race is maintained in its position pressing into engagement with the plastic ring 8 set within the sleeve flange 5.

The self-centering or radially adjustable characteristics of the bearing are made possible by locating an elastic ring 22, on the axially directed extending surface 23 of a shoulder 24 integrally formed at the end of the flange 5. The surface 23 lies opposite to the end 25 of the shank 10 of the inner race 11. The elastic ring 22 rests on the end 25 and is likewise disposed in parallel to the axis of the bearing.

An annular retaining cap 26, holding an annular disk 27, is set within the outer surface of the outer race 14. The annular disk 27 extends between the shank 10 of the inner race and the anti-friction bodies 12 to seal the bearing.

FIG. 2 shows an identical radial anti-friction bearing 2 to that shown in FIG. 1, except that the one shown in FIG. 2 is rotated 180° about a diameter transverse to the axis of the bearing so that the inner race 11 is now free to rotate about the sleeve rather than being held stationary. The outer race ring is held fixed against the resilient ring 8 set within the flange 5. Identical parts of the bearing of FIG. 2 to those shown in FIG. 1 are given the same reference numerals and function in exactly the same way. The support of the bearing shown in FIG. 2 is somewhat different. Here a metal cap 28 having an end 29 is hooked into a groove formed on the outer surface of the outer race 14 and has a radially inwardly directed leg 30 engaging over a grooved shoulder 31 formed in the outer surface of the flange 5. The inner race 11 abuts the clutch release lever.

To produce the self-centering characteristics for the bearing of FIG. 2, an elastic ring 32 is mounted on the surface 18 of the sleeve 1 opposite to the end of the shank 15 of the outer race. The shank 15 is provided as in FIG. 1 with an end surface 33 parallel to the axis X—X of the sleeve. The elastic ring 32 and the surface 33 extend, of course, parallel to the axis of the bearing just as the surface 23 and the ring 22 of FIG. 1. In this embodiment, however, the elastic ring 32 serves also to seal the bearing 2.

The elastic rings 22 and 32 depicted in FIGS. 1 and 2, respectively, are identical and are shown in enlarged scale in FIG. 3. As will be clearly seen the elastic rings 22, 32 comprise an outer rim portion 34 from which a plurality of uniformly spaced studs or tongues 35 extend integrally therefrom inwardly at an oblique angle to the center, indicated by the letter O. The elastic ring may be chosen with desirable resilient characteristics as may be required for the particular operation of the bearing. The elastic ring 22, 32 may be made from any of the synthetics or plastics commonly employed in bearings of this type or from synthetic or natural rubber or similar material.

In FIGS. 4 and 5, a bearing assembly is seen similar to that shown in FIG. 1 which is however modified somewhat by bevelling the corner edge 36 of the inner race 11 at an angle to the axis X—X and by providing a similarly bevelled corner surface 37 between the cylindrical surface 18 of the sleeve 1 and its radially extending flange 5. In FIG. 4, the bevelled surfaces 36 and 37 are parallel to each other, while in FIG. 5 they are at an angle to each other. These corner surfaces provide a safeguard against undesirable twisting of the inner ring 11 in relationship to the sleeve 1. A similar construction and result is possible with the embodiment of FIG. 2 by providing the cap 28 and the outer race with similar anti-twist bevelled surfaces.

FIG. 5 shows still a further varient in that the shank 39 of the inner race 11 is somewhat smaller than that shown in the preceding embodiments. This shortened race is provided with an annular groove 38 in which the studs or tongues 35 of the elastic ring extend. The groove 38 is however set within a cross-sectional plane which is directed parallel to the axis X—X just as in the other embodiments.

During operation the bearing is automatically self-centering since any turning moment placed on the sleeve 1 by its engaging shift mechanisms is compensated for by the resilient load absorbing rings 22, 32. The obliquely extending studs 35 act to provide uniformly distributed resiliency completely about the bearing. It is clearly apparent from the foregoing disclosure that with only a very simple alteration in the form of the flange of the sliding sleeve 1, that it is possible to use the same radial anti-friction bearing first of all as a release bearing with a rotating outer ring and then as a release bearing with a rotating inner ring. This is obtained by the design of the shanks according to the invention, the ends of which serve at the same time for receiving an elastic ring for centering the clutch bearing. The shank of either of the race rings may be used to this end. It is thus necessary to only supply one design of release bearing rather than to design several bearings for particular needs.

Various modifications and embodiments have been shown, other forms will be obvious to those skilled in the present art. It is intended therefore that the present disclosure should be viewed as illustrative of the present invention and not as limiting of its scope.

What is claimed is:

1. A self-centering radial clutch release bearing assembly comprising a supporting sleeve, an inner race ring mounted about said sleeve, an outer race ring and a plurality of anti-friction bodies located therebetween to rotate about said sleeve, one of said race rings being non-rotatable, at least one of said race rings having an annular shank extending therefrom beyond the pitch circle of rotation of said anti-friction bodies, said annular shank having an end lying opposite to a portion of said sleeve and extending in a direction parallel to the axis of said sleeve, and an elastic ring mounted between the end of said shank and said sleeve.

2. The assembly according to claim 1 wherein said elastic ring comprises a rim and a plurality of integrally formed uniformly spaced studs extending inwardly thereof.

3. The assembly according to claim 2 wherein said studs extend at an angle oblique to the center of said ring.

4. The assembly according to claim 1 wherein said sleeve is provided with a radial flange extending parallel to the shank of said non-rotating race, and an elastic ring is retained between said shank and said flange.

5. The assembly according to claim 1 wherein each of said race rings is provided with a radially extending flange terminating in an end extending in a direction parallel to the axis of said sleeve.

6. The assembly according to claim 1 including means for preventing the twisting of said non-rotating race.

7. The assembly according to claim 6 wherein said means comprises bevelled edges formed on the corners of said race and its shank and on the corner of said sleeve and its flange.

8. The assembly according to claim 1 wherein said shank end is formed with a groove for receiving said elastic ring.

9. A self-centering radial clutch release bearing comprising a supporting sleeve, an inner race mounted about said sleeve, an outer race, and a plurality of anti-friction bodies located therebetween to rotate about said sleeve, at least one of said race rings being non-rotatable and having a shank lying opposite to a portion of said sleeve, said shank terminating in an end having a surface directed parallel to the axis of said sleeve, an elastic ring mounted between the end of said shank and said sleeve.

10. The assembly according to claim 9 wherein the end of said shank is provided with a groove for receiving said ring.

* * * * *